United States Patent [19]

Lew et al.

[11] Patent Number: 4,582,330

[45] Date of Patent: Apr. 15, 1986

[54] SEAL WITH CLEFT SEATING SURFACE

[76] Inventors: Hyok S. Lew, 7890 Oak St., Arvada, Colo. 80005; Michael Stranahan, 2858 Woody Creek Rd., Woody Creek, Colo. 81656

[21] Appl. No.: 653,899

[22] Filed: Sep. 24, 1984

[51] Int. Cl.[4] .......................... F16J 15/12; F16J 15/18
[52] U.S. Cl. .................................. 277/206 A; 277/166; 277/226
[58] Field of Search .............. 277/206 R, 206 A, 205, 277/226, 166

[56] References Cited

U.S. PATENT DOCUMENTS

| | | | |
|---|---|---|---|
| 2,470,925 | 5/1949 | Fredrickson | 277/206 A X |
| 2,511,386 | 6/1950 | Warren | 277/206 X |
| 2,700,561 | 1/1955 | Svenson | 277/206 A X |
| 2,888,281 | 5/1959 | Ratti | 277/206 A X |
| 3,083,023 | 3/1963 | Creavey | 277/206 R |
| 3,090,630 | 5/1963 | Gasche | 277/206 R X |
| 3,158,379 | 11/1964 | Nava et al. | 277/206 R |
| 3,612,551 | 10/1971 | Grabill | 277/206 A X |

FOREIGN PATENT DOCUMENTS

| | | | |
|---|---|---|---|
| 851707 | 10/1952 | Fed. Rep. of Germany | 277/206 R |
| 340081 | 4/1936 | Italy | 277/206 A |
| 554093 | 1/1957 | Italy | 277/206 R |
| 814265 | 6/1959 | United Kingdom | 277/206 R |
| 926789 | 5/1963 | United Kingdom | 277/206 A |
| 982219 | 2/1965 | United Kingdom | 277/206 A |
| 1102556 | 2/1968 | United Kingdom | 277/206 A |

Primary Examiner—Robert S. Ward

[57] ABSTRACT

An annular or linear seal having a substantially K-shaped cross section. The seal with cleft seating surface provides a two-way pressure barrier when it is installed in a groove having a cross section of "sigma" shape, wherein the flat side of the K-shaped cross section of the seal with cleft seating surface is in contact with an interface in a sliding relationship and the concave side opposite to the flat side of K-shaped cross section seats on the convex bottom of the groove with a "sigma"-shaped cross section. Of course, the seal with cleft seating surface may be used as a static seal disposed intermediate two surfaces including no movement therebetween.

6 Claims, 10 Drawing Figures

SEAL WITH CLEFT SEATING SURFACE

BACKGROUND OF THE INVENTION

The seals most widely used in fluid power devices can be categorized into two groups; the energized seal including the U-seal, V-seal, lip seal, etc. which are energized either by fluid pressure or by a mechanical spring, and the solid section ring such as the O-ring, Quad-ring, D-ring, Rectangular-rings, etc. In applications where the seal provides a sliding pressure barrier such as shaft seals, piston seals, etc., the energized seal is being used without any exception. The energized seal is an annular seal made of a resilient material having a cross section of U- or V-shape and installed in a groove disposed on an outside or inside circular cylindrical surface in such a way that the concave side of the cross section faces the high pressure side and the convex side faces the low pressure side. The pressure-energized seals are called U-rings, V-rings or lip ring seals depending on the shape of the cross section and are made of a resilient and elastic material such as rubber or other elastomers. The fluid pressure contained at the concave side of the cross section of a pressure-energized seal spreads out the lips or the free-extremities of the cross section of the seal and establishes a leak-proof slidable contact between the lips of the seal and the solid surfaces confining the seal in its groove. The spring-energized seal is essentially a pressure-energized seal comprising an additional means for spreading out the lips of the seal, which means may be a ring of a mechanical coil spring, a metalic ring of U-shaped cross section or a hollow O-ring that is fitted within the U or V shaped groove of the seal facing the high pressure side. Without any exception, all of the energized seals employed in today's fluid control devices are "one-way" seals that provide a leak-proof pressure barrier in one direction only, which is from the concave side to the convex side of the seal cross-section. Consequently, two seals have to be installed back to back in tandem in all applications which require "two-way" seals such as hydraulic or pneumatic actuator cylinders. Another shortcoming possessed by the conventional energized seals such as the U-ring, V-ring and other lip seals is their poor performance at a high temperature as well as at a low temperature. Usually, the energized seals are made of materials with high thermal expansion coefficient. As the operating temperature deviates significantly from the ideal design condition, the seal expands or shrinks to a much greater extent than the metalic element constituting the boundaries confining the seal. As a consequence, the lips of the energized seal may be crushed partially because of the dimensional incompatibility between the seal and the seal-groove and partially because of the structural instability arising from the asymmetric cross section of the U-shaped or V-shaped cross section of the energized seals.

SUMMARY OF THE INVENTION

The primary object of the present invention is to provide a two-way energized seal.

Another object of the present invention is to provide a two-way energized seal having a structurally stable cross section that operates in a wide range of temperatures.

A further object of the present invention is to provide an energized seal having a substantially K-shaped cross section that is installed in a groove of "sigma" shaped cross section.

These and other objects of the present invention will become clear as the description thereof proceeds.

DESCRIPTION OF THE PREFERRED EMBODIMENTS

Figure 1:
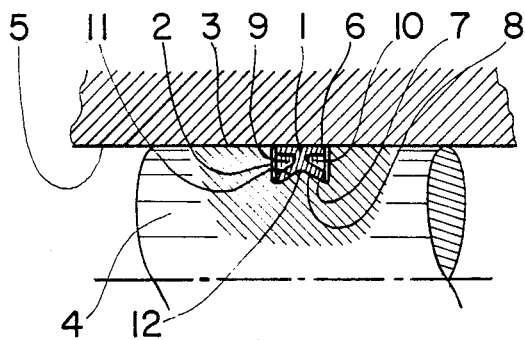
FIG. 1 illustrates a cross section of a seal with cleft seating surface taken along a plane including the central axis of the seal with cleft seating surface of annular geometry, that is confined in a seal groove disposed on an outer circular cylindrical surface.

In FIG. 1 there is shown a cross section of an annular seal with cleft seating surface constructed in accordance with the principles of the present invention, which cross section is taken along a plane including the central axis of the annular seal with cleft seating surface. The seal with cleft seating surface 1 having a K-shaped cross section is disposed in a seal groove 2 having a "sigma" shaped cross section that is formed on the outer circular cylindrical surface 3 of a shaft or piston 4. The shaft or piston 4 engages a circular hole 5 with a diameter closely matched to the diameter of the shaft or piston 4. The K-shaped cross section of the annular seal with cleft seating surface 1 comprises a substantially flat outer cylindrical surface 6 and a V-shaped concave inner cylindrical surface 7 having a root 8. A pair of asymmetric U- or V-shaped grooves 9 and 10 are respectively included on each of two ends of the annular seal with cleft seating surface. The seal groove 2 having a "sigma" shaped cross section includes two walls substantially perpendicular to the outer circular cylindrical surface 3 of the shaft or piston 4 and further includes a bottom of convex outer cylindrical surface 11 having a crest 12. The convex outer cylindrical surface 11 forming the bottom of the seal groove 2 is matched to the concave inner cylindrical surface 7 of the seal with cleft seating surface 1.

The seal with cleft seating surface 1 provides a "two-way" pressure barrier that maintains a pressure difference thereacross without allowing any fluid flow thereacross, while it permits a relative linear and/or angular movement between the shaft or piston 4 and the surface of the circular hole 5. The pressurized-side lip or free extremity of the flat outer cylindrical surface 6 and the pressurized-side lip or free extremity of the concave inner cylindrical surface 7 of the seal with cleft seating surface 1 is always under an air-tight slidable contact with the surface of the circular bore 5 and with the surface of the convex bottom 11 of the seal groove 2, respectively, as those lips are spread apart and pressed onto the respective supporting surfaces. Such an air-tight slidable contact is further enhanced by the force exerted on the seal with cleft seating surface by the pressure difference thereacross that pushes the seal with cleft seating surface in a direction parallel to the central axis of the circular bore 5. Such an axial force on the seal with cleft seating surface tends to expand the circumferential length of the seal with cleft seating surface, as its concave inner cylindrical surface becomes slightly lifted up by the convex outer cylindrical surface forming the bottom of the seal groove. As a consequence, the air-tight slidable contact between the lips of the K-seal and the boundary surfaces confining the seal with cleft seating surface in the seal groove is further enhanced. There is little doubt that the seal with cleft seating surface provides much superior sealing, while it tolerates a greater dimensional discrepancy in the dimensions between the seal and the seal groove. Therefore, the seal with cleft seating surface of the present invention provides a much superior dynamic seal in a wider range of operating temperatures for low to medium pressure applications compared with conventional energized seals such as U-seal, V-seal and other lip seals. The superiority of the seal with cleft seating surface may be easily recognized by comparing a seal with cleft seating surface made of rigid metal with a conventional U-seal or V-seal made of rigid metal. It is quite obvious that the seal with cleft seating surface made of rigid metal will provide an effective seal, while the conventional U-seal or V-seal will not seal at all.

Figure 2:
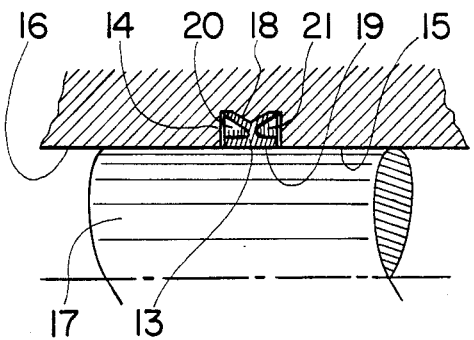
FIG. 2 illustrates a cross section of a seal with cleft seating surface that is confined in a seal groove disposed on an inner circular cylindrical surface.

In FIG. 2 there is illustrated a cross section of a seal with cleft seating surface installed in a seal groove 14 having a "sigma"-shaped cross section wherein the seal groove 14 is disposed on the inner circular cylindrical surface 15 of a circular bore 16 slidably or ratatably receiving a shaft or piston 17. The K-shaped cross section of the seal with cleft seating surface comprises a V-shaped concave outer cylindrical surface 18, a flat inner inner cylindrical surface 19 and a pair of U- or V-shaped grooves 20 and 21 respectively disposed on each of two ends of the seal with cleft seating surface 13. The K-seal 13 provides two-way sealing in the same manner and for the same reason as the seal with cleft seating surface 1 of FIG. 1.

Figure 3:
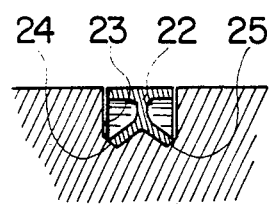
FIG. 3 illustrates a cross section of an embodiment of the seal with cleft seating surface.

In FIG. 3 there is shown a cross section of an embodiment 22 of the seal with cleft seating surface essentially having the same construction as the seal with cleft seating surface 1 and 13 respectively shown in FIGS. 1 and 2. The seal with cleft seating surface 22 is designed to fit in a seal groove 23 having the chamfered corners 24 and 25.

Figure 4:
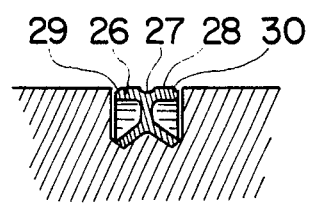
FIG. 4 illustrates a cross section of another embodiment of the seal with cleft seating surface.

In FIG. 4 there is shown a cross section of another embodiment 26 of the seal with cleft seating surface having essentially the same construction as those seal with cleft seating surface 1 and 13 respectively shown in FIGS. 1 and 2. A shallow groove 27 is disposed on the flat cylindrical surface 28 of the seal with cleft seating surface 26, which enhances the lubrication of the flat cylindrical surface 28 and improves the energizing of the seal with cleft seating surface 26 by the fluid pressure. The sliding edges 29 and 30 of the flat cylindrical surface 28 are beveled to improve the wear characteristics of those sliding edges.

Figure 5:
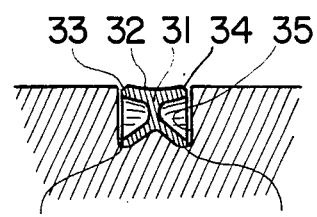
FIG. 5 illustrates a cross section of a further embodiment of the seal with cleft seating surface.

In FIG. 5 there is shown a cross section of a further embodiment 31 of the seal with cleft seating surface that includes a slightly concave flat cylindrical surface 32 and 34 thereof and a seal groove 35 including the rounded corners.

Figure 6:
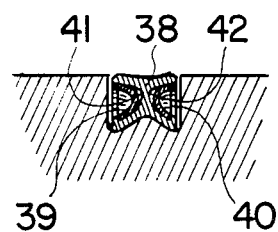
FIG. 6 illustrates a cross section of yet another embodiment of the seal with cleft seating surface.

In FIG. 6 there is shown a cross section of yet another embodiment 38 of the seal with cleft seating surface that is essentially the same as the seal with cleft seating surface 31 shown in FIG. 5 with the exception being that the seal with cleft seating surface 38 is mechanically energized by a pair of annular springs 39 and 40 having a U- or V-shaped cross section, which are respectively fitted in the asymmetric U- or V-shaped grooves disposed on two ends of the seal with cleft seating surface 38.

Figure 7:
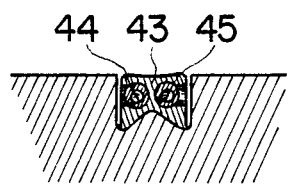
FIG. 7 illustrates a cross section of yet a further embodiment of the seal with cleft seating surface.

In FIG. 7 there is shown a cross section of yet a further embodiment 43 of the seal with cleft seating surface having essentially the same construction as that of FIG. 5 with the exception being that a pair of the annular rings made of a mechanical coil spring 44 and 45, which are fitted in the pair of symmetric U-grooves disposed on two ends of the seal with cleft seating surface 43, energize the seal with cleft seating surface 43.

Figure 8:
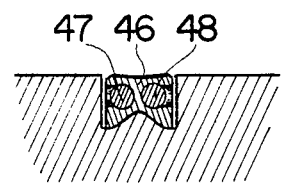
FIG. 8 illustrates a cross section of still another embodiment of the seal with cleft seating surface.

In FIG. 8, there is shown a cross section of still another embodiment 46 of the seal with cleft seating surface. The seal with cleft seating surface 46 has essentially the same construction as the seal with cleft seating surface 43 of FIG. 7 with the exception being that a pair of solid O-rings 47 and 48 replace the pair of spring rings 44 and 45 made of the mechanical coil spring in energizing the seal with cleft seating surface 46. The O-rings 47 and 48 are made of a resilient material. Of course, a pair of hollow O-ring may be employed in place of the solid O-rings 47 and 48 in energizing the seal with cleft seating surface 46.

Figure 9:
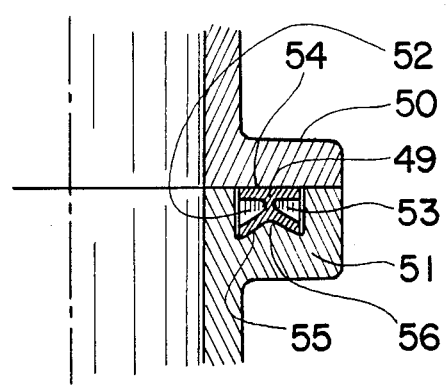
FIG. 9 illustrates a cross section of a seal with cleft seating surface employed to provide sealing between two flanges joined to one another.

In FIG. 9 there is shown a cross section of a seal with cleft seating surface 49 employed in a leak-proof joint of two pipe flanges 50 and 51. The seal with cleft seating surface 49 has a pair of asymmetric U- or V-grooves 52 and 53 respectively disposed on the outer and inner cylindrical surfaces and further includes a flat end 54 and a V-shaped concave end 55 including a root 56. The concave end 55 of the seal with cleft seating surface seats on the convex bottom of the seal groove. The detailed design of the seal with cleft seating surface 49 may include one or more features shown in FIGS. 3 through 8, which are also applicable to the design of the seal with cleft seating surface shown in FIGS. 1 and 2.

Figure 10:
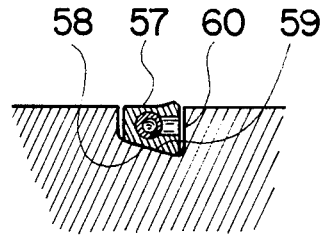
FIG. 10 illustrates a cross section of a one-way seal employing the principles which provide superb sealing for seal with cleft seating surface.

In FIG. 10 there is illustrated a cross section of a one-way seal 57 having a tapered cylindrical surface 58 seated on a tapered bottom of the seal groove 60. The one-way seal 57 employs the same principles as that of the seal with cleft seating surface, which enhance the sealing performance in an extreme temperature application. It is not difficult to realize that the one-way seal 57 comprises one half of the spring energized seal with cleft seating surface 43 shown in FIG. 7. By taking one half of other designs of seal with cleft seating surface shown in FIGS. 3 through 9, different combinations of one-way seals with tapered seating surface may be constructed.

While the principles of the present invention have now been made clear by the illustrative embodiment, it will be immediately obvious to those skilled in the art many modifications of the arrangements, elements, proportion, structures and materials, which are particularly adapted to the specific working environment and operating condition in the practice of the invention without departing from those principles.

We claim:

1. An annular sealing device comprising in combination:
   (a) an annular seal including a first cylindrical surface having a substantially flat cross section and a second cylindrical surface opposite to said first cylindrical surface having a cross section of substantially V-shaped indentation, said annular seal further including an annular groove disposed in a first end face and another annular groove disposed in a second end face opposite to said first end face of said annular seal;
   (b) a seal groove disposed in a cylindrical surface in contact with another cylindrical surface in a close tolerance wherein said annular seal is disposed in said seal groove in a confined relationship, said seal groove including a first end wall confining said first end face of said annular seal; a second end wall opposite to said first end wall confining said second end face of said annular seal; and a cylindrical bottom having a cross section of a substantially V-shaped ridge matched to said V-shaped indentation included in the cross section of said second cylindrical surface of said annular seal; wherein said cylindrical bottom of said seal groove confines said second cylindrical surface of said annular seal.

2. The combination as set forth in claim 1 wherein the first cylindrical surface of said annular seal includes a groove disposed in a coaxial relationship with said annular seal.

3. The combination as set forth in claim 1 wherein the first cylindrical surface of said annular seal includes a slightly concave surface in the cross section of said annular seal.

4. The combination as set forth in claim 1 wherein a first closed loop of spring with a substantially U-shaped cross section is included in one of the end face annular grooves, and a second closed loop of spring with a substantially U-shaped cross section is included in the other end face annular groove.

5. The combination as set forth in claim 1 wherein a first closed loop of coil spring is included in one of the end face annular grooves and a second closed loop of coil spring is included in the other end face annular groove.

6. The combination as set forth in claim 1 wherein a first O-ring is included in one of the end face annular grooves and a second O-ring is included in the other end face annular groove.

* * * * *